United States Patent [19]

Donze et al.

[11] 3,736,471

[45] May 29, 1973

[54] ASSEMBLAGE ELEMENT FOR FUNCTIONAL UNIT WITH CARD CONNECTOR MEANS

[75] Inventors: Michel Donze; Bernard Claude Kohler; Gerard Philippe Manoussi, Paris, France

[73] Assignee: Societe Industrielle Honeywell Bull (Societe Anonyme), Paris, France

[22] Filed: Nov. 16, 1971

[21] Appl. No.: 199,204

[30] Foreign Application Priority Data

Nov. 18, 1970 France ................................7041369

[52] U.S. Cl. ...317/101 D, 317/101 DH, 339/17 LM, 339/176 MP

[51] Int. Cl. ..............................................H02b 1/02

[58] Field of Search .........................339/17 L, 17 LC, 339/17 LM, 17 M, 176 MP; 317/101 D, 101 DH, 117, 118

[56] References Cited

UNITED STATES PATENTS

| | | | |
|---|---|---|---|
| 3,644,868 | 2/1972 | Nevala | 339/17 LM |
| 3,260,982 | 7/1966 | Bostwick | 339/17 LM |
| 3,653,006 | 3/1972 | Kohler | 340/173 SP |
| 2,976,510 | 3/1961 | Blain | 317/101 DH |
| 3,311,863 | 3/1967 | Beale | 317/101 DH |
| 3,215,968 | 11/1965 | Herrmann | 339/17 LM |
| 3,197,766 | 7/1965 | Stein | 317/101 D |

*Primary Examiner*—Robert K. Schaefer
*Assistant Examiner*—Gerald P. Tolin
*Attorney*—William F. White, Ronald T. Reiling, Fred Jacob et al.

[57] ABSTRACT

A read-only memory wherein a complete unit thereof is fabricated as a pluggable circuit board, the board being adapted to function with different storage components by supporting the storage components in a removable pluggable fashion, the board proper holding in fixed form those elements and circuits which are invariant for different storage components.

4 Claims, 7 Drawing Figures

ASSEMBLAGE ELEMENT FOR FUNCTIONAL UNIT WITH CARD CONNECTOR MEANS

BACKGROUND OF THE INVENTION

The present invention relates to an improvement to the apparatus disclosed in the French patent application filed Dec. 27, 1968 and the corresponding U.S. patent application Ser. No. 887,940, filed Dec. 24, 1969, now U.S. Pat. No. 3,653,006 by B. C. Kohler et al. for Pluggable Circuit Board Assembly.

This assemblage element, which has been usually provided for implementing a portion of a resistor fixed memory and its associated circuits, consists essentially of a principal printed circuit board bearing pluggable contact pads on the two faces of a first edge thereof for insertion into an appropriate connector. Such principal board is made part of a general structural assembly. Toward the edge opposite to the aforementioned first edge of the principal board two connectors are provided, one attached to one face and the other to the opposite face of the principal board. These two connectors are so oriented that two removable card-planes, each bearing encoded memory elements, can be plugged into the connectors, whereby the card-planes are parallel to and on opposite sides of the principal board. The orientation of these connectors is further adapted to provide for plugging the two card-planes into their respective connectors and for plugging the assemblage element into its connector in the same direction and in the same sense.

The crowding of this assemblage element with respect to one of its dimensions is relatively great because its total length is the approximate sum of the length of the principal board added to the length of a card-plane. It was therefore entirely apparent to limit the length of the principal board. This limitation led to mounting elements consisting of coupling circuits and read amplifiers on the two faces of the principal board and providing these with printed circuits, requiring the use of relatively costly advanced techniques.

Therefore, it is the object of the present invention to provide an improved assemblage element of the type desired, such element being directed toward reducing lengthwise crowding and thereby enabling a more economical fabrication.

SUMMARY OF THE INVENTION

In accordance with the instant invention, there is provided an assemblage element of circuits for mounting a resistor fixed memory comprising a principal board having a first edge pluggable into a corresponding connector and a pair of connectors each disposed for receiving and guiding a removable card-plane on a second edge opposite to the first edge. The latter two connectors are so disposed that the two card-planes are parallel to the principal board. Each card-plane bears two resistor memory planes. The principal board is sufficiently longer than a card-plane and the two connectors are attached on the same side of one face of the principal board and are oriented so that the direction of plugging of the card-plane is opposite to the direction of plugging of the assemblage element.

According to another characteristic of the invention, the principal board consists of a sheet of insulating material bearing printed circuits, particularly on its exterior faces, and the components and modules forming the coupling circuits and the read amplifiers are disposed on the face of the principal board to which are attached the connectors and guide-uprights.

BRIEF DESCRIPTION OF THE DRAWING

The invention will be described with reference to the accompanying drawing, wherein.

DESCRIPTION OF THE PREFERRED EMBODIMENT

Figure 1A:
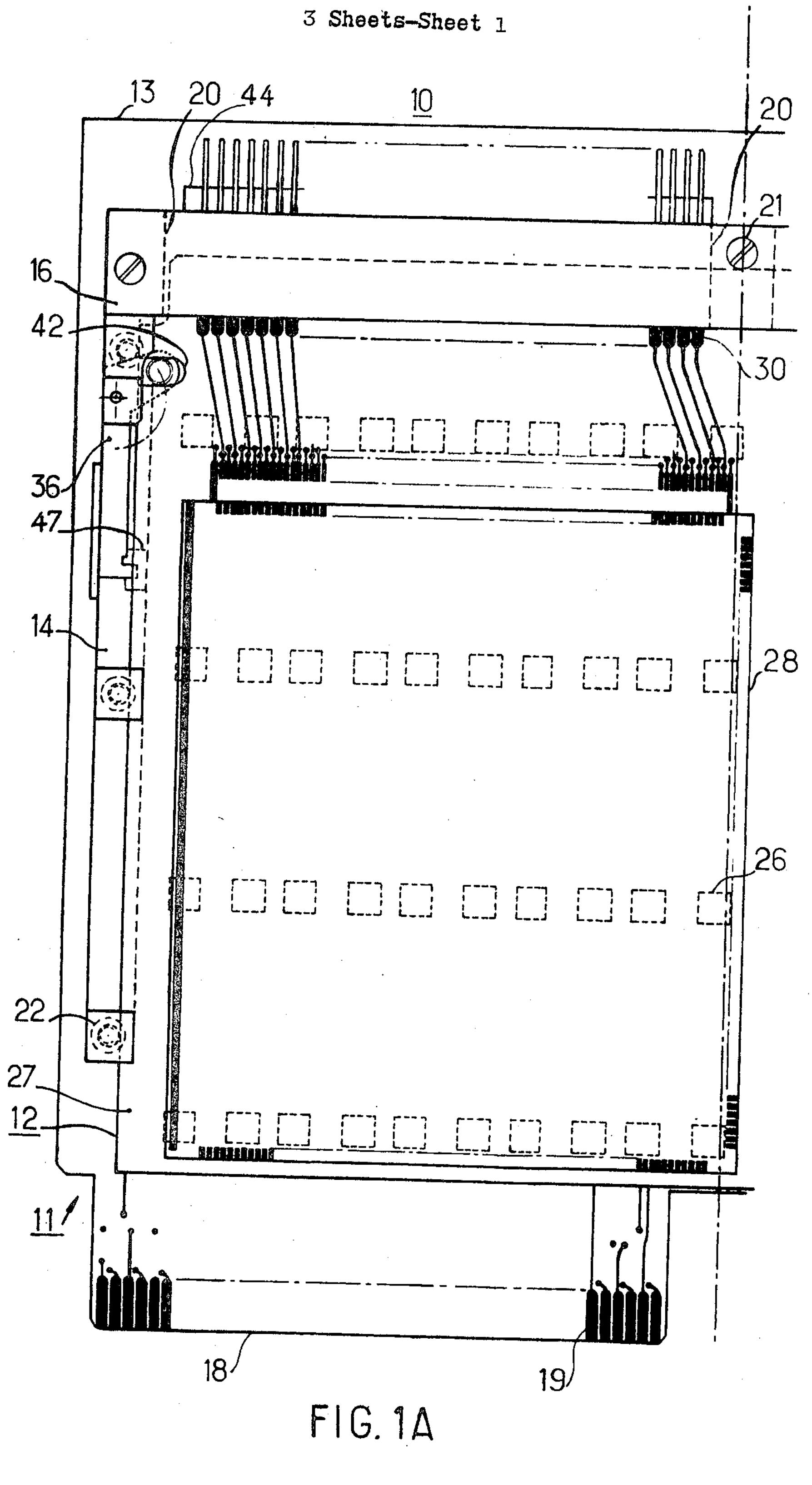
FIGS. 1A and 1B are a view of a face of the assemblage element of the invention, wherein the two halves of the element, which are not entirely symmetrical, are shown in respective ones of the figures.

No further reference will be made to the structure and the arrangement of the resistor fixed memories, the transistorized switching matrices, the coupling circuits, or the read amplifiers, since these elements have been fully explained and described in the above-mentioned patent applications. It is to be noted, however, that the electric circuits and their components that are included in the instant improved assemblage element are equivalent to those described previously.

FIGS. 1A, 1B, 2 and 3 illustrate an assemblage element 10 comprising primarily a principal board 11 and two card-planes 12. Principal board 11 comprises a base plate 13 to which are attached two guide-uprights 14 and 15, as well as two connectors 16 and 17, which may be identical. The principal board 11 is sufficiently longer than the two card-planes 12 so as to provide a pluggable edge 18 which extends out from underneath the card-planes 12.

In relation to the pluggable edge 18 of base plate 13, which bears on its two faces contact pads 19, connectors 16 and 17 are attached one above the other toward the opposite edge of base plate 13 through the intermediary of three shims 20 so as to adequately space connector 17 from the upper face of base plate 13. This grouping is held in place by bolts 21.

Figure 3:
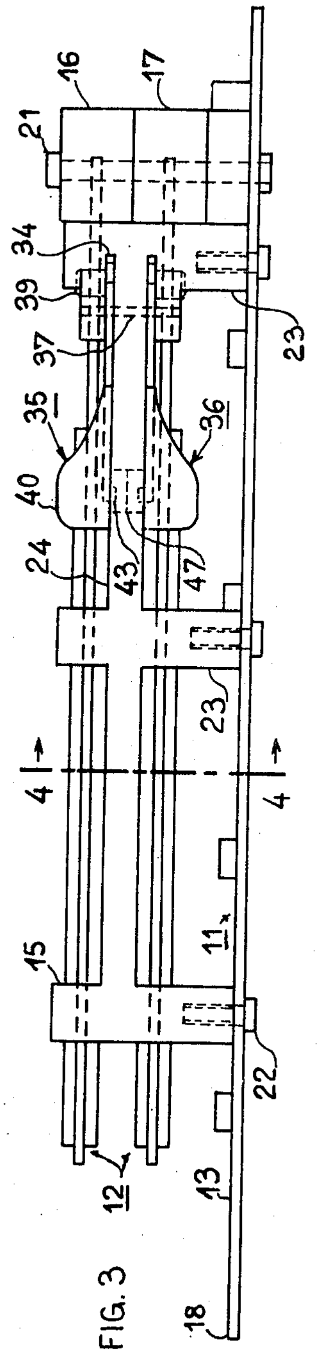
FIG. 3 is another end view of the assemblage element of FIG. 1.
Figure 4:
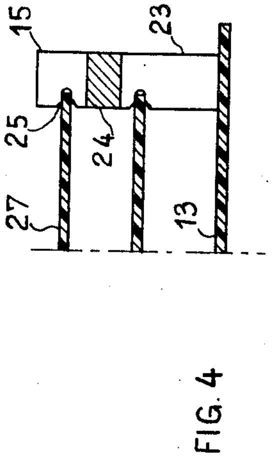
FIG. 4 is a partial cross-sectional view taken through a guide upright of FIG. 1.

Guide-uprights 14 and 15, which may be mutually symmetrical, are attached to base plate 13 by screws 22. FIGS. 3 and 4 show how each guide-upright 14 and 15 has a configuration formed of three posts 23 connected by a web 24 of lesser thickness. This configuration is intended to facilitate cooling ventilation. Guide grooves 25 are provided in the posts 23 of guide-uprights 14 and 15 so as to guide each card-plane 12 opposite to a corresponding one of connectors 16 and 17, either at the time of insertion or extraction of the card-plane.

The mode of attachment of the connectors may differ from that indicated above, for example by providing means for fastening the ends of connectors 16 and 17 on the ends of guide-uprights 14 and 15.

Since the area of base plate 13 is now much greater, transistorized modules 26, constituting the read amplifiers, are disposed on a single face and on the same side as the connectors. Base plate 13 may consist of a printed circuit board of simplified fabrication.

The processes of soldering the elements attached to the upper face can similarly be simplified, since when the pre-tinned tabs of the modules are soldered by heating (electrode heating or infrared rays) the ends of the leads of other components passing through metallized holes may be soldered at the level of the lower face by the well-known process of "wave" soldering.

Each card-plane 12 in the assemblage may be identical to that described in the above-mentioned patent applications. Thus, each card-plane 12 consists of a printed circuit board 27 whose base is a sheet of an epoxy glass, and bears two memory planes 28. Each card-plane 12 also bears transistorized modules 29 constituting a switching sub-matrix, as well as printed circuits, some of which terminate in the form of contact pads, such as contact pads 30, for the memory bit conductors and contact pads 31 for the input leads of the switching sub-matrices.

Figure 1B:
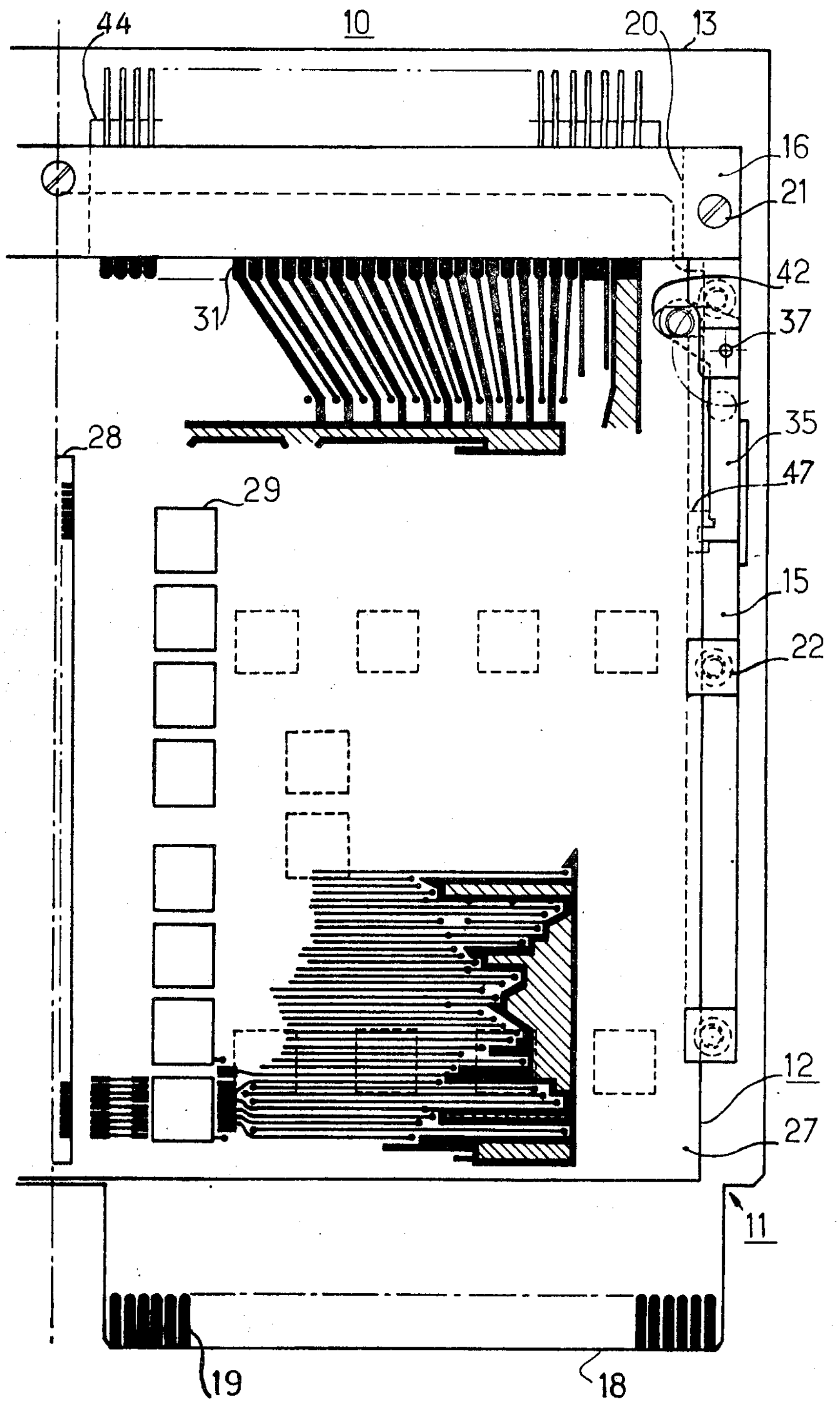
Figure 2:
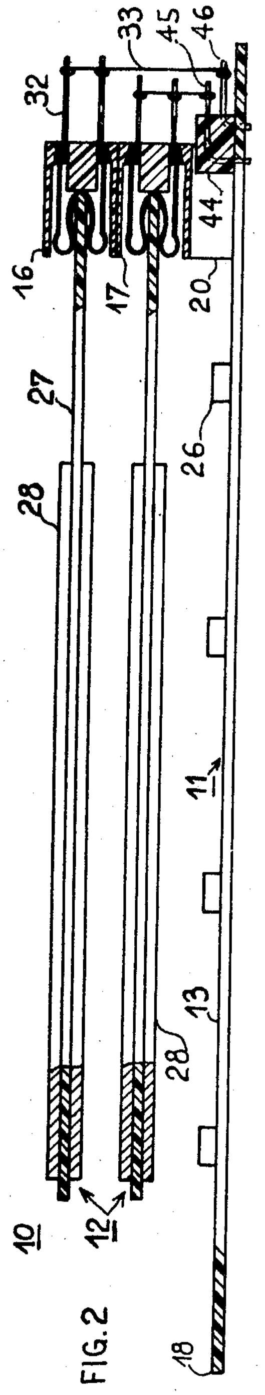
FIG. 2 is an end view, partially in cross-section, of the assemblage element of FIG. 1.

FIGS. 1A, 1B and 2 illustrate two intermediate connection elements, each in the form of a block 44 of insulating material into which are molded two sets of conductors 45, 46, which are bent at right angles.

The lugs, such as lugs 32, of contact springs emerging from connectors 16 and 17, can be conveniently connected to the ends of conductors 45 and 46 to which they are parallel by wire wrapped connections, such as connection 33. The ends of conductors 45 and 46 which are perpendicular to base plate 13 and extend beyond its lower face may be soldered to corresponding printed circuits at the time of the wave soldering operation.

Because of the relatively large number of contact springs provided in each of connectors 16 and 17 the effort required for the manual insertion of a card-plane 12 into its connector is quite substantial. In order to reduce this effort required, an additional improvement is provided in assemblage element 10. This improvement consists of providing a lever plugging system on each side of a card-plane 12. For this purpose, the extreme right-hand post 23 of a guide-upright, such as guide-upright 15, is provided with two slots 34 for receiving two levers 35 and 36 which are symmetrical, FIG. 3. Levers 35 and 36 are adapted for turning around a common axle 37, fitted into the guide-upright. Lever 35, shown in detail in FIGS. 5 and 6, consists of an angle member 38 provided with a lever arm at the end of which is attached a shoulder pin 39. A wing 40 provides a longer lever arm than that between hole 41 and pin 39.

A notch 42 is provided on each lateral edge of board 27 at an appropriate distance from the pluggable edge of each of card-planes 12 (FIGS. 1A and 1B). Before a card-plane is plugged into its corresponding connector, levers 35 and 36 must be turned sufficiently (as shown by the broken line trace in FIG. 1B) for pins 39 to permit the passage of the corresponding card-plane 12, which is guided in the corresponding grooves 25 of the guide-uprights. Then by moving the wings 40 of levers 35 and 36 toward their respective guide-uprights, pins 39 become engaged in notches 42, whereupon continuing this movement of wings 40, the card-planes 12 are found to easily be plugged into their corresponding connectors.

Figure 6:
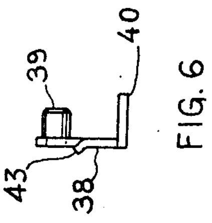
FIGS. 5 and 6 are two detailed views of one of the operating levers of the assemblage element.
Figure 5:
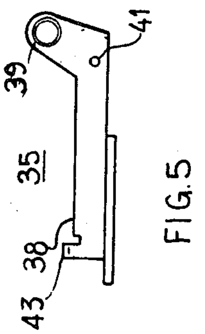

During the maintenance of the assemblage element and when card-planes 12 are extracted, levers 35 and 36 may be "opened"; i.e. be removed from their angular position shown in FIGS. 1A and 1B. In order that these levers are held in this position, angular member 38, FIGS. 5 and 6, is provided with a small catch 43, bent at 45°. The webs 24 of guide-uprights 14 and 15 are provided with beveled portions 47 (FIGS. 1A, 1B and 3) at the same angle. The bent edge of catch 43 extends slightly beyond angle member 38, so that it is sufficient to slightly raise the end of lever 35, for example, when a card-plane is plugged in so that the lever may be operated.

For extracting a card-plane the corresponding levers are operated in an opposite manner, although this is only possible if the assemblage element 10 is itself removed from its connector and also completely withdrawn from the general structural assembly.

Thus, the lengthwise crowding of the assemblage element is reduced according to the instant invention because the length of base plate 13 is only that necessary to exceed the total length of a card-plane, i.e., from its pluggable edge 18 to connectors 16 and 17 (FIG. 2).

Much that has been described in the foregoing and that is represented on the drawing is characteristic of the invention. It is evident that one skilled in the art is able to adduce all modifications of form and detail using his judgment, without departing from the scope of this invention.

What is claimed is:

1. An assemblage of circuits for mounting a resistive fixed memory consisting of a principal board having a first edge containing means pluggable into an external connector block, said principal board having affixed thereto a pair of connector blocks, each receiving and guiding a removable card-plane bearing two resistor memory planes and disposed toward a second edge opposite to said first edge in a manner that said two card-planes are parallel to said principal board, comprising the improvement wherein: said principal board is longer than the length of said card-planes, and said pair of connector blocks are attached to the same side of the principal board and are so oriented that the direction of plugging in of the card-plane is toward said pair of connector blocks and opposite to the direction of plugging in of the principal board to said external connector block.

2. The assemblage element of claim 1, wherein said principal board consists of a sheet of insulating material bearing printed circuits on its two faces, and wherein components and modules forming coupling and read amplifier circuits are disposed on the face of said board to which are attached said connectors.

3. The assemblage element of claim 2, wherein each card-plane is provided with a notch on each lateral edge thereof, and wherein said principal board is provided proximate each lateral edge thereof with a guiding upright which is fitted with a pivotally attached pivoting lever corresponding to one of said notches, said lever having an arm bearing a pin for insertably engaging a corresponding one of said notches of said card-plane, whereby the plugging and unplugging with respect to its connector of a card-plane is effected by simultaneously operating the two corresponding levers.

4. A circuit board assembly for plugging into an external electrical connector comprising a principal circuit board, said principal board being provided with a row of electrical contacts near one edge thereof for plugging into said external electrical connector, a pair of additional circuit boards, each of said additional boards being provided with a row of electrical contacts, a pair of elongated electrical connectors, each of said elongated electrical connectors mating with a row of contacts on a respective one of said additional boards and supporting said respective additional board parallel to said principal board, wherein the improvement comprises: means mounting said elongated electrical connectors on the same side of said principal board at an edge opposite said one edge, one of said elongated electrical connectors being spaced further from said same side than the other one of said elongated electrical connectors, both of said elongated electrical connectors being oriented to provide for the mating of one of said additional boards therewith in a direction opposite to the direction of mating of said principal board with said external electrical connector.

* * * * *